United States Patent [19]

Belvin et al.

[11] 4,174,987
[45] Nov. 20, 1979

[54] METHOD OF MAKING HEAT EXCHANGE STRUCTURE

[75] Inventors: David S. Belvin, Seattle; Clifford R. Perry, Renton; Dale F. Watkins, Sumner, all of Wash.

[73] Assignee: The Boeing Company, Seattle, Wash.

[21] Appl. No.: 894,251

[22] Filed: Apr. 7, 1978

[51] Int. Cl.$^2$ .................. B31D 3/02; B32B 31/00
[52] U.S. Cl. .................... 156/197; 156/290
[58] Field of Search .......... 156/290, 197, 295

[56] References Cited
U.S. PATENT DOCUMENTS 2,887,425   5/1959   Holland .................. 156/197

Primary Examiner—Douglas J. Drummond

[57] ABSTRACT

The heat exchange structure made by the method of the present invention comprises a plurality of sheets, desirably thin film plastic, bonded to one another to form the unitized structure. Alternate first pairs of sheets are bonded one to another along a first set of longitudinally extending bond lines positioned at first transverse locations along the width dimensions of the sheets. There is a second set of pairs of alternately spaced sheets (made up of adjacent sheets of adjoining first pairs of sheets) which are bonded one to another along a second set of longitudinally extending bond lines positioned transversely intermittently with respect to the first set of longitudinal bond lines. In the method of the present invention, the sheets are arranged in vertically stacked relationship. One set of bonding bars is positioned between sets of adjacent intermediate pairs of sheets at the locations where the first set of longitudinally extending bond lines are to be formed. A second set of bars is positioned between sets of adjacent second pairs of sheets at the locations where the second set of longitudinally extending bond lines are to be formed. The bars are maintained in pressure contact with the sheets and raised to a temperature to cause heat sealing of the sheets at the locations of the bars.

8 Claims, 8 Drawing Figures

FIG. 3
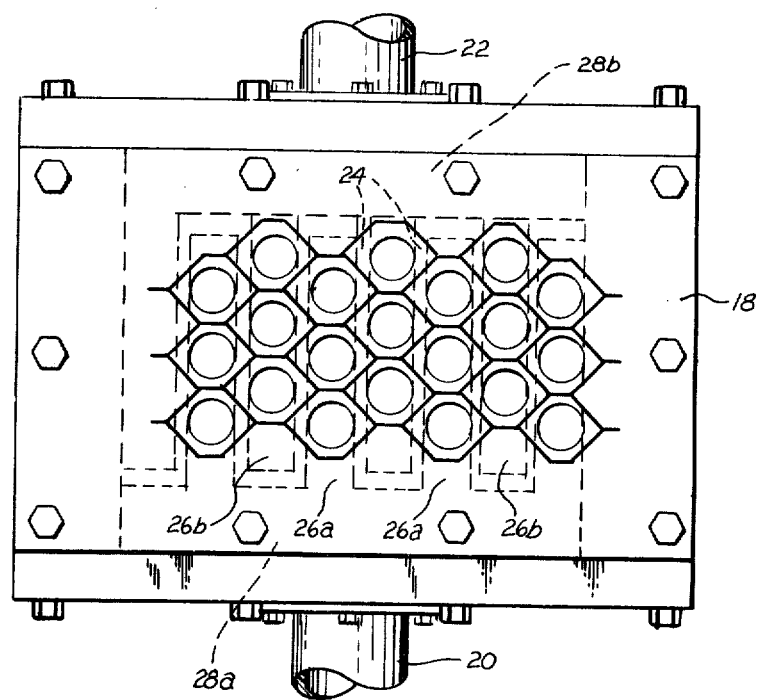
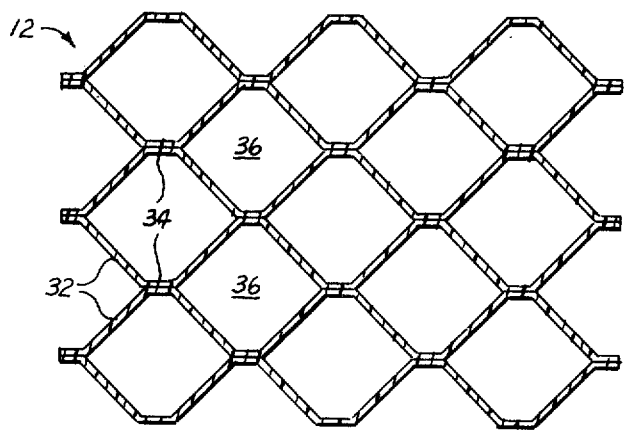
FIG. 4

METHOD OF MAKING HEAT EXCHANGE STRUCTURE

BACKGROUND OF THE INVENTION

A. Field of the Invention

The present invention relates to a method of forming a structure particularly adapted for use as a heat exchange structure.

B. Brief Description of the Prior Art

The structure made according to the method of the present invention is well adapted for use in conjunction with heat exchange systems where saline or brackish water is converted to potable water. Accordingly, the general state of the prior art with regard to such heat exchangers and the method of making the same will be given consideration with reference to such systems. A common arrangement for such systems is to employ two distinct heat exchangers. The first heat exchanger is generally a counterflow heat exchanger and is used to place the brine which is initially flowing into the system in heat exchange relationship with the potable water flowing from the system to transfer heat from the potable water to the incoming brine and raise its temperature from ambient temperature to a higher temperature, possibly in the order of 200° F. or so. The second heat exchanger is a condenser/evaporator type heat exchanger where the brine is pumped to the upper end of the heat exchanger and caused to fall as a thin film over one side of a set of heat exchange surfaces. At the same time, steam which is derived by heating the brine is compressed to a higher pressure and exposed to the opposite side of the heat exchange surfaces to be in heat exchange relationship with the brine film. This causes potable water to condense on the second set of surfaces and also causes evaporation of water from the brine flowing downwardly on the opposite side. This condensed water is collected and passed out through the first counterflow heat exchanger to raise the temperature of the incoming brine as described above.

In general, there have been two common arrangements for the elements which provide the heat exchange surfaces. One is to provide a plurality of plates arranged parallel to one another and spaced a short distance from each other, so that a plurality of adjacent passageways are formed by the various sets of plates; this is commonly called a flat plate heat exchanger. One heat exchange medium is directed through a first set of alternately spaced passages, while the second heat exchange medium is directed through the second set of passageways spaced intermittently with the first set. Thus, heat is transferred from one heat exchange medium to the other through the plates.

The second general arrangement for heat exchangers is to provide the heat exchange elements in the form of elongate tubes which extend through a heat exchange chamber and are spaced a moderate distance from one another. One heat exchange medium is directed into the interior of the tubes, while the other heat exchange medium is directed into the area between and around the outside of the tubes. In some instances, the second heat exchange medium flows in a direction transverse to the longitudinal axes of the tubes, and in other arrangements, the second heat exchange medium is directed parallel to the longitudinal axes of the tubes.

Since one of the main factors influencing the effectiveness of the heat exchanger is the heat transfer characteristics of the material separating the two heat exchange mediums, it has been quite common to fabricate the heat exchange elements from a metal which has a high thermal conductivity. However, for massive heat exchange installations, such as those used in producing potable water from saline water, the cost of providing and maintaining heat exchange elements in a quantity and size necessary to provide the heat exchange surface required, is a significant factor in determining whether the overall heat exchange system is economically feasible. This becomes particularly critical where metal is used as the material for the heat exchange elements, since the fabrication and installation of a vast number of metallic heat exchange elements can become a substantial portion of the cost of the entire system.

Accordingly, there have been attempts in the prior art to fabricate the heat exchange elements from other materials, and one of the results is research and development work in thin plastic film heat exchangers. Since plastic, in comparison to metal used in heat exchangers, is a relatively poor conductor of heat, for such films to operate with reasonable effectiveness, it is necessary to make the films quite thin to obtain adequate transfer of heat. The result is that the film material is generally relatively flexible and fragile in comparison to comparable metal heat exchange structures. When the thin film plastic is arranged as planar sheets to form the heat exchange surfaces (in the general configuration of metal panels), it becomes difficult to maintain the sheets in proper spaced relationship with respect to one another. One of the reasons for this is that to operate the heat exchanger, either as a counterflow heat exchanger or an evaporative type heat exchanger it is generally necessary to have at least some pressure differential between the two heat exchange mediums.

It has also been attempted in the prior art to provide thin film plastic heat exchangers in the form of tubular heat exchange elements. This alleviates to some extent the problem posed by pressure differential between the heat exchange mediums, since the higher pressure heat exchange medium can be directed into the interior of the tubes which are then caused to assume a generally circular configuration in response to the internal pressure. However, for practical commercial operation, these tubes must be provided in relatively long lengths, and there are quite often problems of instability in the tubes oscillating or becoming positioned against one another in response to the influence of the flow of the heat exchange medium or mediums either through or around the tubes. Not only does this create problems in preserving the structural integrity of the heat exchange structure, but it also creates a problem in the optimization of the heat transfer characteristics of the heat exchanger.

With regard to the various heat exchange devices shown in the literature of United States patents, the following are noted:

U.S. Pat. No. 1,955,261, Tryon et al, shows a heat exchanger where there are a plurality of tubes which are arranged in an alternating pattern and cast into a block made of a suitable metal, such as aluminum or copper.

U.S. Pat. No. 2,347,957, McCullough, shows a heat exchanger comprising a tubular member arranged in a circuitous pattern and having a number of fins extending therefrom to improve heat transfer.

U.S. Pat. No. 3,161,574, Elam, shows a condensor type heat transfer device where thin film plastic tubes are used as the heat exchange elements. Pressurized steam is directed into the interior of the tubes, and brine is directed as a film over the outside surface of the tubes.

U.S. Pat. No. 3,315,740, Withers, shows a heat exchanger made up of a tube bundle. The ends of the tubes are gathered together in a manner to form a fluid tight end portion of the tubular heat exchanger.

U.S. Pat. No. 3,493,040, Davison, shows a plate-type heat exchanger where the plates are formed with dimples to provide for proper spacing of the plates.

U.S. Pat. No. 3,537,935, Withers, shows a heat exchanger formed with plastic tubes, with one heat exchange medium being directed through the tubes and the other heat exchange medium being directed along a path transverse to the lengthwise axis of the tubes, commonly called a crossflow heat exchanger.

U.S. Pat. No. 3,616,835, Laurenty, is generally representative of a flat type heat exchanger.

U.S. Pat. No. 3,790,654, Bagley, teaches a method of extruding thin-walled honeycombed structure. While the teaching of this patent is not directed specifically toward heat exchangers, it does state that such honeycomb structures are used in reginerators, recuperators, radiators, catalyst carriers, filters, heat exchangers and the like.

U.S. Pat. No. 3,825,460, Yoshikawa et al, shows a carbonaceous honeycomb structure where tubular-like elements are formed into a variety of structures having elongate passageways, some of which are triangular, some of which are circular, and some of which are hexagonal.

U.S. Pat. No. 3,926,251, Pei, shows a counterflow heat exchanger where circular tubes are laid down, then expanded into contact with one another. In one embodiment, the tubes are arranged in a pattern so that the end passageways are formed as squares. In another configuration the tubes are arranged so that the end configuration of the passageways are hexagonal.

U.S. Pat. No. 3,948,317, Moore, discloses glass-ceramic tubes which are formed into a honeycomb configuration for use as heat exchangers.

U.S. Pat. No. 3,983,283, Bagley, discloses a ceramic honeycomb structure for use as a catalytic converter or heat exchanger.

U.S. Pat. No. 4,002,040, Munters, shows a cross-current heat exchanger, where an airstream is cooled by evaporating moisture into a second air stream placed in heat exchange relationship with the first air stream.

U.S. Pat. No. 4,029,146, shows several configurations of a corrogated metal panel used as a heat exchanger.

The following patents are noted as broadly representative of various prior art devices: U.S. Pat. No. 2,820,744, Lighter; U.S. Pat. No. 3,168,450, Black; 3,239,000, Meagher; 3,367,843, Clive et al; 3,396,785, Kirsch; 3,428,529, Gumucio, 3,672,959, Sweet; 3,703,443, Evans; and 3,929,951, Shibata et al.

SUMMARY OF THE INVENTION

The method of the present invention forms a structure particularly adapted for use as a heat exchange structure providing plurality of heat exchange passageways. This structure has a longitudinal axis, a lateral axis and a vertical axis. It comprises a plurality of thin film sheets aligned longitudinally and laterally with one another and spaced vertically from one another. Alternate pairs of these sheets are bonded one to another along a plurality of first longitudinally extending bond lines, positioned at predetermined laterally spaced first locations across said sheets. Intermediate pairs of these sheets are bonded one to another along a plurality of second longitudinally extending bond lines positioned at laterally spaced second locations across the sheets. The second bond lines are positioned transversely intermediate of the first locations, with each of the intermediate pairs of sheets being made up of adjacent sheets of adjacent alternate pairs of these sheets.

In the method of the present invention, the thin film sheets which are to form the heat exchange structure are positioned adjacent one another in both longitudinal and transverse alignment, and in vertically stacked relationship. A first set of bonding bars is placed between adjacent alternate pairs of said sheets at first locations where the first longitudinally extending bond lines of the alternate sheets are to be located. A second set of longitudinally extending bonding bars is placed between intermediate pairs of the sheets at second locations where second longitudinally extending bond lines are to be located. Each of the intermediate pairs of sheets is made up of adjacent sheets of adjacent alternate pairs of sheets. The bars are caused to be in pressure contact with these sheets and also to be at a temperature sufficiently high to cause bonding of the sheets one to another at the locations of the first and second longitudinally extending bond lines.

In the preferred form, the sheets are bonded one to another by initially placing the bars between the sheets at a lower temperature and raising the temperature of the bars to cause heat sealing of the sheets one to another. This is desirably accomplished by making the bars of an electrically conductive material, and then raising the temperature of the bars by passing electric current through the bars.

Subsequent to bonding the sheets one to another, the structure formed by bonding the sheets if expanded to form a plurality of diamond-shaped passageways. The end portions of the structure are connected to suitable manifold structures so that heat exchange mediums can be passed through the structure.

In one embodiment, sheet portions at the bond lines are bonded one to another by engaging opposite sides of the sheet portions with a pair of bonding bars. In a second embodiment, pairs of sheet portions at the bond lines are bonded one to another by pressing a bar against a related one of a sheet portions and engaging the other of said sheet portions with a separating strip to prevent the bonding of the other sheet portion to a third adjacent sheet portion.

More specifically, the first embodiment of the method of the present invention is accomplished by placing a first set of longitudinally extending bonding bars between first and second sheets at a first set of laterally spaced, longitudinally extending first locations corresponding to locations on the sheets where bonds are to be made between second and third sheets. Then a second set of longitudinally extending bonding bars is placed between the second and third sheet at longitudinally extending, laterally spaced second locations positioned intermittently with respect to the first locations of the first set of bars. Then additional sets of bonding bars are placed between additional pairs of sheets in a pattern similar to that of the first and second sets of bars. The bars are then caused to be in pressure contact with the sheets at a temperature sufficiently high to cause bonding of the sheets to one another.

With regard to the second embodiment, this is accomplished specifically by placing a first set of longitudinally extending bonding bars between first and second sheets at a first set of laterally spaced, longitudinally extending first locations corresponding to locations on the sheets where bonds are to be made between second and third sheets. Then a second set of longitudinally extending bonding bars are placed between the second and third sheets at longitudinally extending, laterally spaced second locations positioned intermittently with respect to the first locations of the first set of bars. A first set of separating strips is placed between third and fourth sheets at longitudinally extending, laterally spaced third locations vertically aligned with the first locations of the first set of bars. A second set of separating strips is placed between the fourth and fifth sheets at longitudinally extending, laterally spaced fourth locations positioned vertically above the second locations of the second set of bars. Additional sets of bars and separating strips are placed between additional pairs of sheets in substantially the same pattern as described above in this paragraph. The bars are brought in pressure contact with the sheets at temperatures sufficiently high to cause bonding of the sheets one to another.

Other features of the present invention will become apparent from the following detailed description.

Brief Description of the Drawing

FIG. 3 is a sectional view through the heat exchange structure and illustrating the upper manifold structure;

FIG. 4 is a sectional view of a portion of the heat exchange structure made according to the present invention;

DESCRIPTION OF THE PREFERRED EMBODIMENTS

Figure 1:
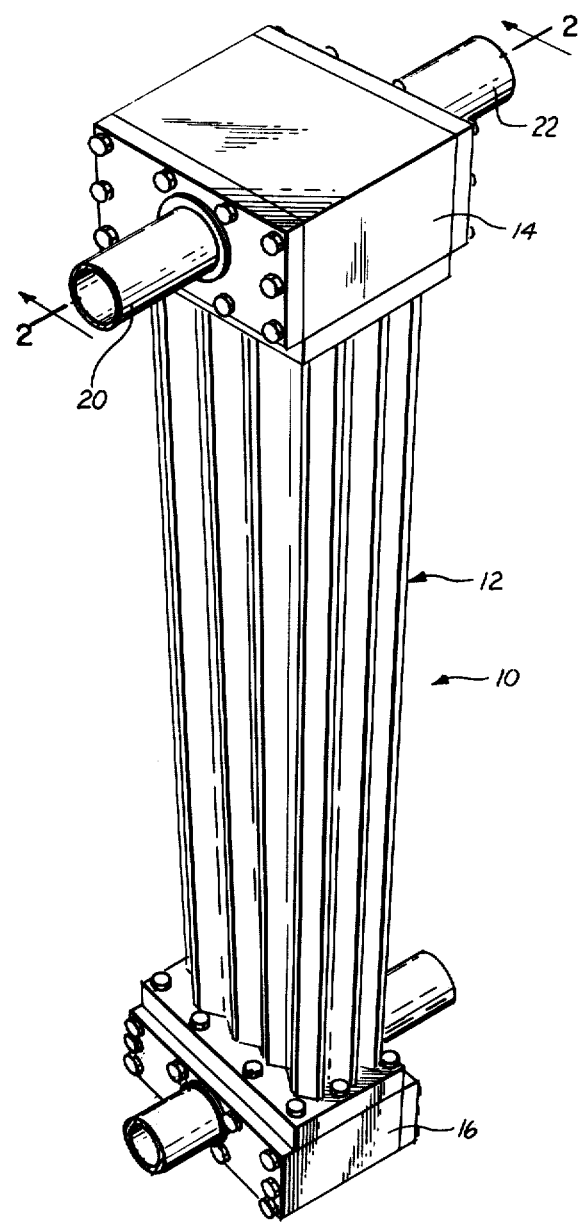
FIG. 1 is a perspective view of a heat exchange unit incorporating the heat exchange structure made by the method of the present invention.

It is believed a clearer understanding of the present invention will be obtained by first describing a heat exchange unit which incorporates the heat exchange structure made by the method of the present invention. As illustrated in FIG. 1, there is a heat exchange unit 10, comprising a main heat exchanger 12 and upper and lower end manifolds 14 and 16, respectively. Before describing in detail the heat exchange structure 12 made by the method of the present invention, the upper and lower manifolds 14 and 16 will be described briefly.

Figure 2:
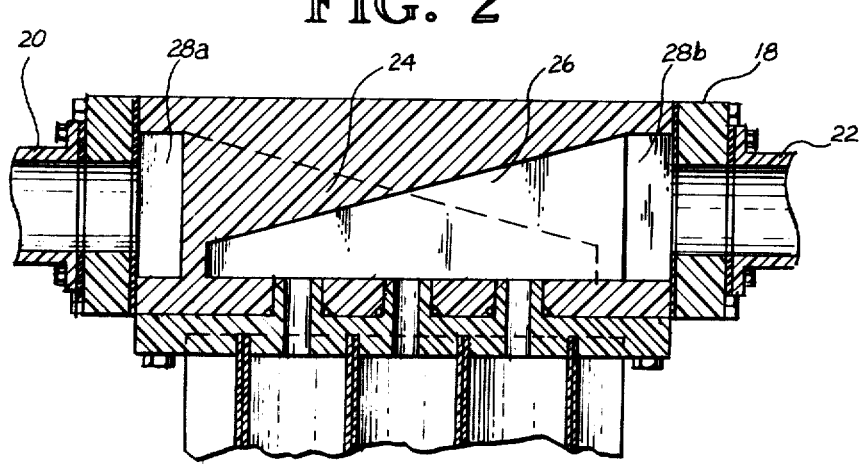
FIG. 2 is a sectional view taken along line 2—2 of FIG. 1.

The upper and lower manifolds 14 and 16 are substantially identical, so only the upper manifold 14 is shown in FIGS. 2 and 3. It can be seen that the manifold 14 comprises a box-like housing 18 having a pair of oppositely positioned feed conduits 20 and 22. The manifold 14 has a plurality of longitudinally extending interior wall members 24 which divide the interior of the manifold 14 into a plurality of parallel distribution channels 26.

These channels 26 are arranged in an alternating pattern so that half of the channels 26a open to a manifold chamber 28a which in turn communicates with the conduit 20, while the other half of the channels 26b, positioned intermittently between the channel 26a, communicate with a second manifold chamber 28b which in turn communicates with the conduit 22. There are a plurality of through openings 30 leading from the distribution channels 26a and 26b into the heat exchange structure 12.

The details of the heat exchange structure 12 which is made according to the method of the present invention are best illustrated in FIG. 4. This structure 12 comprises a plurality of thin film sheets 32, which in the preferred form are made of a suitable plastic. Each sheet 32 is arranged in what might be described as a "zig zag" pattern, with the sheets 32 being bonded to one another along a plurality of longitudinally extending bond line portions 34 to form a plurality of diamond-shaped heat exchange passageways 36. This particular arrangement of the heat exchange structure 12 is believed to be novel and is descirbed in another patent application, assigned to the same assignee of the present invention and entitled, "Heat Exchange Apparatus, Method of Making the Same, and Methods of Utilizing Said Heat Exchange Apparatus."

Figure 5:
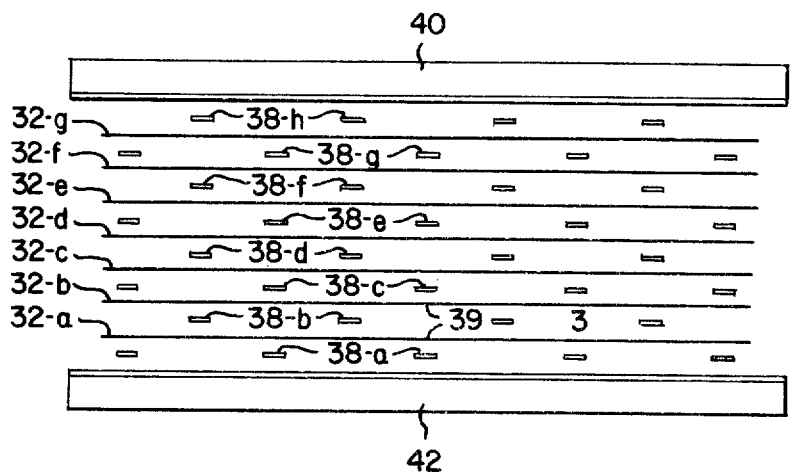
FIG. 5 is a semi-schematic front elevational view of a "stack up" utilized in a first embodiment of the method of the present invention, with the various components separated vertically from one another for purposes of illustration.

To describe how the first embodiment of the method of the present invention, reference is made to FIG. 5, which is a semi-schematic showing of a "stack up" of the components employed in practicing this first embodiment. In describing the method of the present invention, the "longitudinal axis" will be considered that axis parallel to the length of the passageways 36 formed in the end configuration of the heat exchange structure 12. The "transverse axis" will be considered as that axis generally parallel to the transverse width dimensions of the sheets 32. The "vertical axis" will be considered that axis perpendicular to the longitudinal and transverse axes, and perpendicular to each of the planes generally occupied by the sheets 32.

In the view of FIG. 5, the transverse axis extends across the drawing, and the vertical axis extends between the upper and lower portions of the drawing. Thus, the view looking down onto the page showing FIG. 5 is generally along (i.e. parallel to) the longitudinal axis. In FIG. 5, there is shown a plurality of sheets 32 prior to bonding. These sheets 32 have a generally rectangular configuration and are desirably made of thin film plastic. However, it is to be understood that within the broader aspects of the present invention, other materials could be used, provided such materials have the proper structural and heat exchange characteristics.

In a typical commercial installation, while not being necessarily limited to these dimensions, the length of the sheets could be between about 20 to 50 feet, and the width dimensions between about 1 to 6 feet. For ease of illustration, in FIG. 5 only seven sheets 32 are shown, it being understood that a substantially greater number could be used. Typically, the sheets 32 could be made of 2 to 4 mil TEDLAR (a trademark identifying a polyvinylfluoride type plastic material), and would be made as thin as practical, consistent with the operational requirements of the end configuration. The thickness of the sheets can be between about 0.005 to 0.02 inch, and desirably between about 0.002 to 0.006 inch, with a sheet thickness of 0.004 being suitable for a number of applications.

To bond the sheets 32 to one another in the proper end configuration, there are provided a plurality of elongate bonding bars 38 shown in end view in FIG. 5. The length of these bars 38 is at least as great as the length of the sheets 32 to be bonded; the width dimension of these bars 38 is approximately the same as the width dimension of each of the bond line portions 34 of the heat exchange structure 12 being formed.

In describing the "stack up" in FIG. 5, the seven sheets 32 are designated 32-*a* through 32-*g*, sequentially, with the bottom sheet being designated 32-*a*, and the top sheet being designated 32-*g*. There is a first set of longitudinally extending bars 38-*a* positioned below the lowermost sheet 32-*a* at regular transversely spaced intervals. There is a second set of bars 32-*b* positioned between the sheets 32-*a* and 32-*b* at transversely spaced regular intervals, and positioned intermediate the locations of the first set of bars 38-*a*. A third set of bars 38-*c* is positioned between the two sheets 32-*b* and 32-*c*, with these bars 38-*c* being located at transversely spaced locations vertically aligned with the first bars 38-*a*. This same pattern of positioning the bars 38 in a staggered alternating relationship is repeated upward throughout the entire "stack up" shown in FIG. 5, with the uppermost bar 38-*h* being positioned above the top sheet 32-*g* and in vertical alignment with the set of bars 38-*b*.

Figure 6:
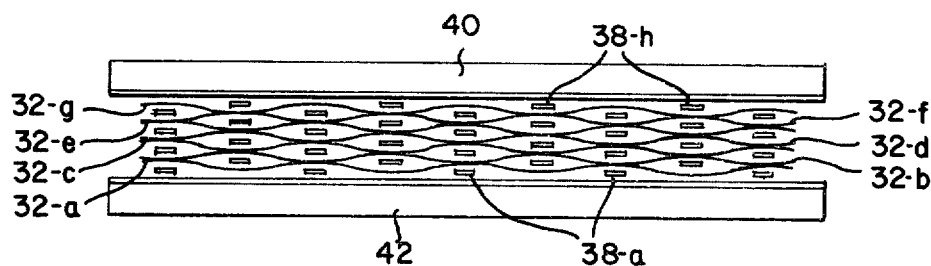
FIG. 6 is a view similar to FIG. 5 showing the "stack up" of FIG. 5 during the bonding operation.

For purposes of illustration, in FIG. 5, the sheets 32 and the bars 38 are shown spaced vertically from one another moderate distances. In actual practice, the arrangement would be such that the sheets 32*a-g* and bars 38*a-h* would be pressed between upper and lower plates 40 and 42. The pressure exerted by the plates 40 and 42 would be adequate to insure proper contact of the bars 38 along their entire length with the sheets 32. When the sheets 32*a-g* and bars 38*a-h* are positioned as shown in FIG. 6, but with the bars 38*a-h* in actual contact with the sheets 32*a-g*, the temperature of the bars 38*a-h* is raised to a temperature adequate to soften the sheet portion 39 therebetween. This heating of the bars 38 can be conveniently accomplished by making the bars of an electrically conductive material and passing electric current through the bars 38*a-h* for a short period of time. After the initial heating of the bars 38*a-h* to a suitable temperature, the bars are permitted to cool so that each of the two sheet portions 39 between each vertically adjacent pair of bars 38 are heat sealed one to another to form the longitudinal bond line portions 34.

Thus, it can be seen that alternate pairs of sheets (i.e. one alternate pair being sheets 32-*a* and 32-*b*, a second alternate pair being sheets 32-*c* and 32-*d*, etc.) are bonded one to another along a plurality of first longitudinally extending bond lines, positioned at transversely spaced first locations across the sheets. Intermediate pairs of sheets, made up of adjacent sheets of adjoining alternate pairs of sheets (i.e. one intermediate pair being sheets 32-*b* and 32-*c*, a second intermediate pair of sheets being sheets 32-*d* and 32-*e*, etc.), are bonded one to another along a plurality of second longitudinally extending bond lines positioned at transversely spaced second locations which are transversely intermediate the locations of the first bond lines. After the bonding is accomplished as illustrated in FIG. 6, the resulting structure 12 is moved longitudinally relative to the bars 38*a-h* until the structure 12 is completely free of the bars 38. The resulting structure 12 can be expanded by suitable means (e.g. pressurized air) to bring the structure 12 to the configuration shown in FIG. 4, where there are a plurality of diamond-shaped passageways 36. With the structure 12 maintained in this configuration by suitable means (e.g. forming rods inserted in the passageways 36), the two end portions of the structure 12 can then be secured in a suitable manner to the upper and lower manifolds 14 and 16.

In some applications, it is not necessary to apply heat to both sides of the sheet 32 to obtain an adequate heat seal therebetween. Thus, in the second embodiment of the method of the present invention, as shown in FIGS. 7 and 8, the bonding is accomplished by applying heat directly against the surface of only one of two sheet portions being bonded to one another.

Figure 7:
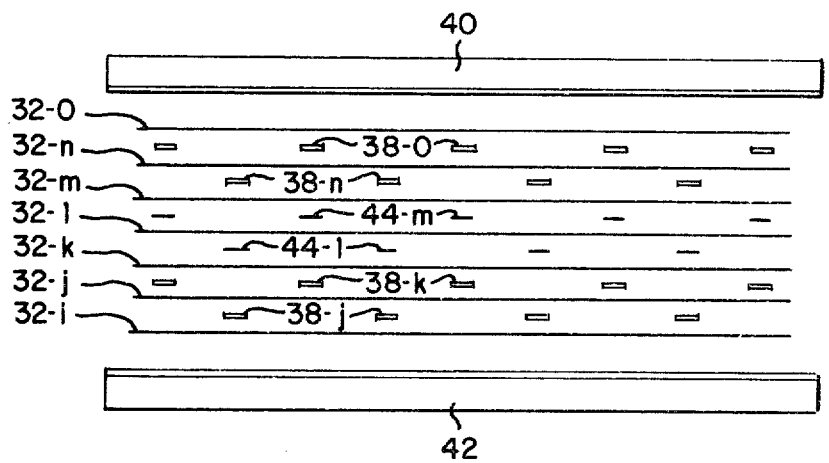
FIG. 7 is a view similar to FIG. 5 showing the "stack up" of the components used to practice a second embodiment of the method of the present invention.
Figure 8:
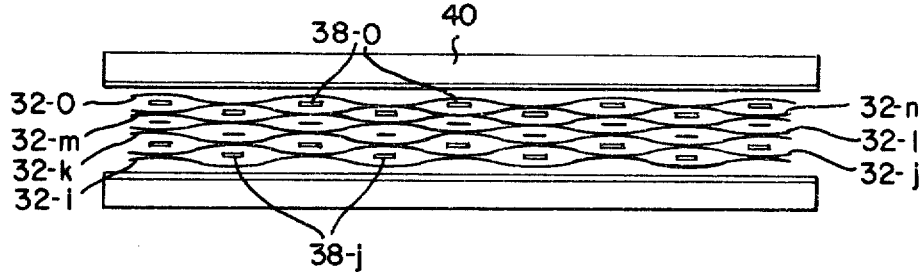
FIG. 8 is a view similar to FIG. 6, showing the components of FIG. 7 during the bonding operation.

To describe this second embodiment, in the "stack up" of FIG. 7, there are seven sheets designated sequentially from bottom to top 32-*i* through 32-*o*. However, there are only four transverse rows of bonding bars, these being designated 38-*j*, 38-*k*, 38-*n*, and 38-*o*. The lowermost set of bars 38-*j* are positioned between sheets 32-*j* and 32-*i* at transversely spaced locations corresponding to the locations of the bars 32-*b* as shown in FIG. 5. The bars 38-*k* of the next set are positioned between sheets 32-*k* and 32-*j*, at transversely spaced locations corresponding to those of the bars 38-*a* in FIG. 5.

Between sheets 32-*l* and 32-*k* there is provided a first set of separating strips 44-*l* located at transversely spaced locations corresponding to those of the bars 38-*d* in FIG. 5. Between sheets 32-*m* and 32-*l*, there is a second set of separating strips 44-*m*, at transverse locations corresponding to those of bars 38-*e* in FIG. 5. Above the separating strips 44-*l* and 44-*n* are two more sets of bars 38-*n* and 38-*o* arranged in the same pattern as the bars 38-*j* and 38-*k*. While only seven sheets are shown in FIG. 7, it is to be understood that as additional sheets 32 are added, the same alternating pattern of bars 38 and separating strips 44 is repeated vertically upward through the stack of sheets 32.

The separating strips 44 are made of a suitable material (e.g. teflon) which will not adhere to the sheets 32 when the sheets 32 are raised to a heat sealing temperature. The length of the separating strips 44 is at least as great as the length dimension of the sheets 32, and the width dimension is moderately greater than the width dimension of the bars 38.

FIG. 8 illustrates the "stack up" of FIG. 7 with the upper and lower plates 40 and 42 pressing the components pressed against one another with moderate pressure so that heat sealing can be accomplished by heating the bars 38. For convenience of illustration the bars 38-*j* through 38-*o* are shown spaced moderately from the sheets 32. When heat is applied to the bars 38-*j*, 38-*k*, 38-*n*, and 38-*o*, this softens the sheet portions 46 which are pressed against one another because of one of the sheet portions 46 being in contact with one of the bars 38*j*, *k*, *n*, or *o*. Upon cooling of the bars 38, heat sealing between each of the sheet portions 46 is accomplished. The end configuration of the bonded structured is substantially the same as that shown in FIG. 4.

What is claimed is:

1. A method of forming a structure particularly adapted for use as a heat exchange structure providing a plurality of heat exchange passageways, said structure being a longitudinal axis, a lateral axis and a vertical axis, said structure comprising:

a. a plurality of thin film heat sealable plastic sheets aligned longitudinally and laterally with one another and spaced vertically from one another,
b. alternate pairs of said sheets being bonded one to another along a plurality of first longitudinally extending bond lines, positioned at predetermined laterally spaced first locations across said sheets,
c. intermediate pairs of said sheets being bonded one to another along a plurality of second longitudinally extending bond lines positioned at laterally spaced second locations across said sheets, said second bond lines being positioned transversely intermediate of said first locations, each of said intermediate pairs of sheets being made up of adjacent sheets of alternate pairs of said sheets, said method comprising:
a. placing a plurality of thin film heat sealable plastic sheets, which are to form the heat exchange structure, adjacent one another in both longitudinal and transverse alignment, and in vertically stacked relationship,
b. placing a first set of bonding bars between alternate pairs of said sheets at first locations where the first longitudinally extending bond lines of said alternate sheets are to be located,
c. placing a second set of longitudinally extending bonding bars between intermediate pairs of said sheets being made up of adjacent sheets of adjacent alternate pair of sheets,
d. causing said bars to be in pressure contact with said sheets and heating said bars to a temperature sufficiently high to cause bonding of said sheets to one another at the locations of the first and second longitudinally extending bond lines, and
e. removing the bars from the sheets.

2. The method as recited in claim 1, wherein said sheets are bonded to one another by initially placing the bars between the sheets at a lower temperature and raising the temperature of said bars to cause heat sealing of said sheets one to another.

3. The method as recited in claim 2, wherein said bars are made of a material which is electrically conductive, and the temperature of said bars is raised by passing electric current through said bars.

4. The method as recited in claim 1, wherein subsequent to bonding said sheets to one another, the structure formed by bonding said sheets is expanded to form a plurality of diamond-shaped passageways, after which end portions of said structure are connected to suitable manifold structures so that heat exchange mediums can be passed through said structure.

5. The method as recited in claim 1, wherein sheet portions at said bond lines are bonded one to another by engaging opposite sides of said sheet portions by a pair of bars.

6. The method as recited in claim 1, wherein pairs of sheet portions at said bond lines are bonded one to another by pressing a bar against a related one of said sheet portions and engaging the other of said sheet portions with a separating strip to prevent the bonding of said other sheet portion to a third adjacent sheet portion.

7. A method of forming a structure particularly adapted for use as a heat exchange structure providing a plurality of heat exchange passageways, said structure having a longitudinal axis, a lateral axis and a vertical axis, said structure comprising:

a. a plurality of thin film plastic heat sealable sheets aligned longitudinally and laterally with one another and spaced vertically from one another,
b. alternate pairs of said sheets being bonded one to another along a plurality of first longitudinally extending bond lines, positioned at predetermined laterally spaced first locations across said sheets,
c. intermediate pairs of said sheets being bonded one to another along a plurality of second longitudinally extending bond lines positioned at laterally spaced second locations across said sheets, said second bond lines being positioned transversely intermediate of said first locations, each of said intermediate pairs of sheets being made up of adjacent sheets of adjacent alternate pairs of said sheets, said method comprising:
a. placing a plurality of thin film heat sealable plastic sheets, which are to form the heat exchange structure, adjacent one another in both longitudinal and transverse alignment, and in vertically stacked relationship,
b. placing a first set of longitudinally extending bonding bars between first and second sheets at a first set of laterally spaced, longitudinally extending first locations corresponding to locations on said sheets where bond are to be made between said second and a third sheet,
c. placing a second set of longitudinally extending bonding bars between said second and third sheets at longitudinally extending, laterally spaced second locations positioned intermittently with respect to said first locations of said first set of bars,
d. placing additional sets of bonding bars between additional pairs of said sheets in a pattern similar to that of the first and second sets of bars,
e. causing said bars to be in pressure contact with said sheets and heating said bars to a temperature sufficiently high to cause bonding of said sheets one to another at the locations of the first and second longitudinally extending bond lines, and
f. removing the bars from the sheets.

8. A method of forming a structure particularly adapted for use as a heat exchange structure providing a plurality of heat exchange passageways, said structure having a longitudinal axis, a lateral axis and a vertical axis, said structure comprising:

a. a plurality of thin film heat sealable plastic sheets aligned longitudinally and laterally with one another and spaced vertically from one another,
b. alternate pairs of said sheets being bonded one to another along a plurality of first longitudinally extending bond lines, positioned at predetermined laterally spaced first locations across said sheets,
c. intermediate pairs of said sheets being bonded one to another along a plurality of second longitudinally extending bond lines positioned at laterally spaced second locations across said sheets, said second bond lines being positioned transversely intermediate of said first locations, each of said intermediate pairs of sheets being made up of adjacent sheets of adjacent alternate pairs of said sheets, said method comprising:
a. placing a plurality of thin film heat sealable plastic sheets, which are to form the heat exchange structure, adjacent one another in both longitudinal and transverse alignment, and in vertically stacked relationship, b. placing a first set of longitudinally extending bonding bars between first and second sheets at a first set of laterally spaced, longitudinally extending first locations corresponding to locations on said sheets where bonds are to be made between said second sheet and a third sheet, c. placing a second set of longitudinally extending bonding bars between said second and third sheets at longitudinally extending, laterally spaced second locations positioned intermittently with respect to said first locations of said first set of bars, d. placing longitudinally extending separating strips between said third sheet and a fourth sheet at longitudinally extending, laterally spaced third locations vertically aligned with the first locations of the first set of bars, e. placing a second set of bonding strips between said fourth sheet and a fifth sheet at longitudinally extending, laterally spaced fourth locations positioned vertically above the second locations of the second set of bars, f. placing additional sets of bars and separating strips between additional sheets in substantially the same pattern as described in paragraphs b, c, d, and e immediately above, with respect to said first and second sets of bars and said first and second sets of separating strips, g. causing said bars to be in pressure contact with said sheets and heating said bars to a temperature sufficiently high to cause bonding of said sheets to one another at the locations of the first and second longitudinally extending bond lines, and h. removing the bars from the sheets.

* * * * *